June 11, 1946.　　　　F. P. DILLON　　　　2,401,748
AIRCRAFT SEAT SUPPORTING STRUCTURE
Filed Oct. 17, 1944　　　2 Sheets-Sheet 1

Inventor
Frederick P. Dillon
By
Attorney

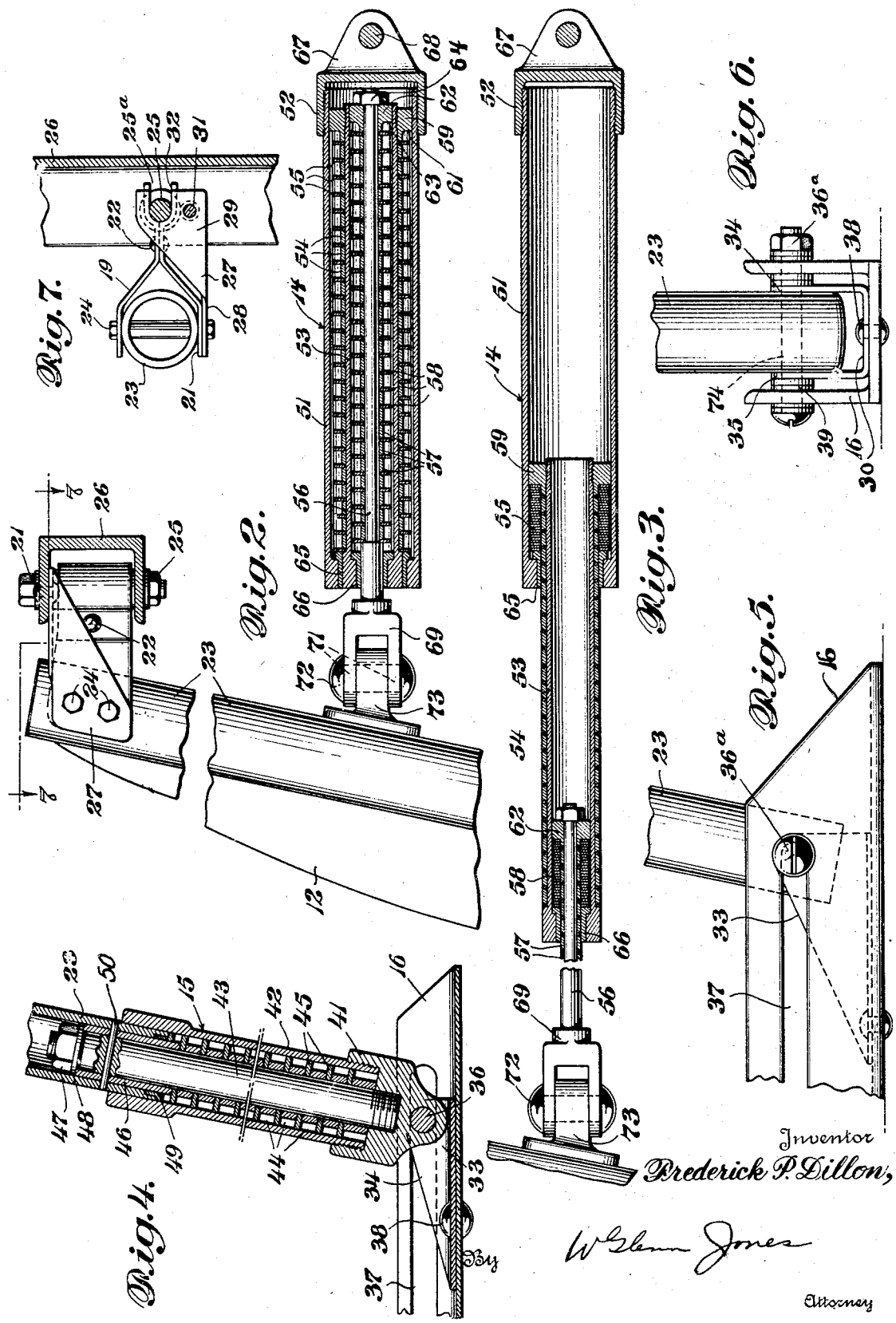

Patented June 11, 1946

2,401,748

UNITED STATES PATENT OFFICE 2,401,748

AIRCRAFT SEAT SUPPORTING STRUCTURE

Frederick P. Dillon, United States Navy

Application October 17, 1944, Serial No. 559,104

11 Claims. (Cl. 244—122)

(Granted under the act of March 3, 1883, as amended April 30, 1928; 370 O. G. 757)

This invention relates to an improvement in airplane pilot seats and, in particular, is concerned with yieldable means for supporting such a seat.

Heretofore, it has been the experience where crash landings of aircraft have taken place, very serious and, in many cases, fatal injuries to the pilot have resulted by reason of failure of the seat safety belt and/or seat structure, causing the pilot to be thrown violently against the instrument panel or other structure of the aircraft. Due to the very high rate of deceleration, tremendous forces are imposed upon the seat and supporting structure so that even though the pilot and passenger seats and the anchorages thereof may have been designed to withstand relatively high loadings, no structures have been employed heretofore which will gradually absorb extreme loadings so as to cause a cushioning effect to prevent serious injuries to the pilot or passenger. It has been estimated that an individual may be capable of withstanding forces of as great a magnitude as 50 G's provided the safety belts and the seat remained fixed, so that in the use of the invention embodied herein even greater forces may be successfully resisted.

It is an object of this invention, therefore, to provide a mounting for a pilot or passenger seat which will absorb the tremendous forces imposed thereon in case of a sudden stoppage such as that experienced in a crash landing so that serious injury to the pilot or passenger is prevented.

It is another object of this invention to provide a secondary support for a seat which is capable of absorbing at a decelerating rate the forces incident to crash landings.

Still a further object of this invention is to provide a series of fittings and supports for a seat which will absorb excessive forces imposed upon the seat structure whether they be encountered in a horizontal or a vertical direction.

A still further object of this invention is to provide support for a pilot or passenger seat which will permit the seat to shear loose from its primary anchorage and yet prevent the occupant thereof from being thrown forward violently and unrestrained to sustain bodily injury.

These and the various other objects and advantages of this invention will become apparent from a reading of the following specification and the accompanying drawings of which:

Fig. 2 is a sectional view of the horizontal shock absorber and one of the topmost seat fittings;

Fig. 3 is a sectional view of the shock absorber of Fig. 2 shown at its fully extended final position;

Fig. 4 is an enlarged sectional view of one of the bottom seat fittings and supporting structure;

Fig. 5 is an enlarged view of a modified seat fitting and supporting structure;

Fig. 6 is an end elevation view of the structure shown in Fig. 5; and

Fig. 7 is a cross-sectional view taken at 7—7 of Fig. 2.

Figure 1:
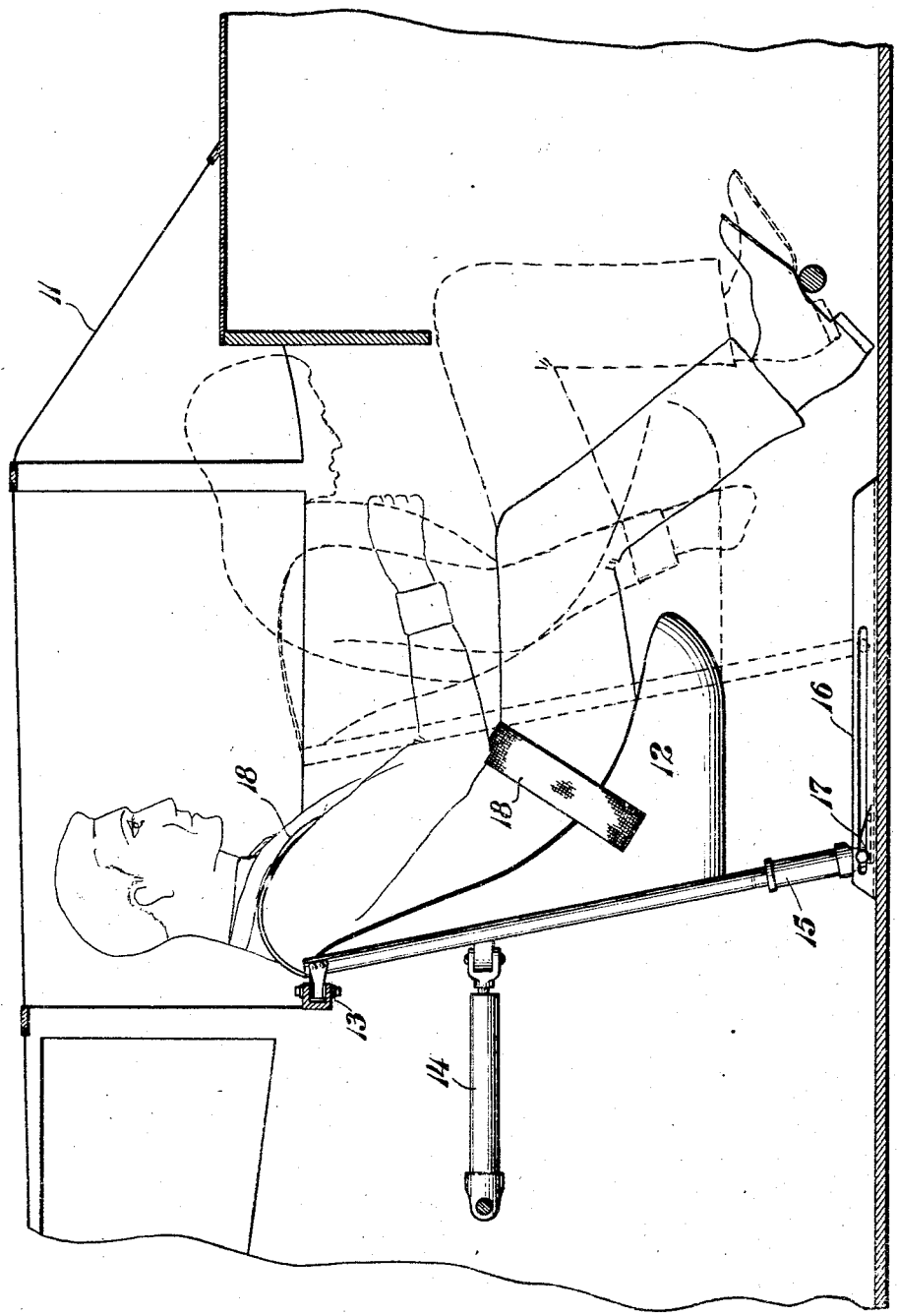
Fig. 1 is a side elevational view of the pilot seat and supporting structure both before and after the seat has been caused to move forward by reason of a sudden stoppage of the aircraft.

With reference to Fig. 1, there is shown an airplane cockpit and enclosure indicated generally by numeral 11, a pilot seat 12 mounted therein, a pilot seat top supporting structure 13, horizontal shock absorber 14 secured to the back of the seat and to the main structure of the airplane, and vertical shock absorber 15 secured to a track 16 by means of a support 17. The conventional lap and shoulder harness 18 is shown in the full line portion of the drawing of Fig. 1, restraining the pilot in the normal take-off or landing position, and, in the dotted line portion, which is substantially the position the pilot will attain should the seat be torn away from its primary supporting fittings causing the shoulder straps of the harness to stretch somewhat by reason of excessive forces imposed thereon due to a rapid stoppage of the aircraft.

A pair of symmetrical upper supports 13, Figs. 2 and 7, secured to either side of pilot seat 12 comprises a forked member consisting of cooperating symmetrically formed metal plates 19 and 21 secured together by a rivet 22 and fastened to the pilot seat stanchion 23 by through bolts 24. The opposite ends of plates 19 are shaped to form a clevis 25a so as to engage snugly the bolt 25, which bolt passes through suitable openings in the aircraft structural channel member 26. An additional fixture 27, for primarily resisting the load at the top of the seat, is provided with flanges 28 and 29 and secured to stanchion 23 by bolts 24 passing through openings in flange 28 and to channel 26 by a shear resisting rivet 31 passing through the opening in flange 29. The indentation 32 permits flange 29 to engage the bolt 25 for one-half of its circumference in a fashion similar to that of clevis 25a, so that any tendency of the seat to pivot is opposed thereby eliminating the possibility of a torsional load being imposed upon rivets 31.

Each of the bottom primary supports 17, Figs. 1 and 4, consists of a channel 33 provided with opposed triangular shaped side portions 34 and 35 and base 30 secured to the bottom of the vertical shock absorber 15 by bolt assembly 36, of which the bolt passes through longitudinal slots 37 of channel track 16. At its base 30, fixture 33 is secured to track 16 by shear rivet 38. Suitable spacing washers 39 are provided for centering the fixture 33 within channel track 16.

Vertical shock absorber 15, Fig. 4, comprises an end fitting 41, tubular member 42 threadably secured thereto, a stud 43 positioned within tubular member 42 and threadably engaged at one end to fitting 41, a plurality of rings 44 and shear washers 45 spaced alternately along stud 43, a short tubular sleeve 46 positioned on stud 43 and a nut 47 and washer 48 secured to the opposite end of the stud 43 for engaging and insuring fixed placement of rings 44 and washers 45. To the bottom of stanchion 23 is attached a hardened metal bushing 49. The complete shock absorber assembly 15 is attached to stanchion 23 by means of shear pin 50, which pin passes through stanchion 23, sleeve 46 and stud 43.

The horizontal shock absorber 14 comprises a tubular member 51 threadably engaged at one end by fitting 52, a sleeve 53 telescoped within the member 51, a plurality of rings 54 and shear washers 55 spaced alternately along member 53, and a rod 56 reduced to a uniform diameter for the greater portion of its length and upon which are alternately spaced a plurality of rings 57 and shear washers 58. A spacer 59, having a shoulder 61, is threadably secured to the end of sleeve 53 thereby insuring rigidity and fixed placement of rings 54 and shear washers 55. In like manner, a similar spacer 62, having shoulder portion 63, is secured to rod 56 by nut 64 thereby providing for fixed placement of the rings 57 and washers 58. Hardened metal bushings 65 and 66 are provided at the ends of tubular member 51 and sleeve 53 respectively. Lug 67 of end fitting 52 is provided with an aperture 68 through which a bolt or other fastening means may be passed for securing one end of the shock absorber 14 to the aircraft structural members. The free end of rod 56 is formed into the shape of a fork 69, having apertures 71 therein adapted to receive a rivet 72 or other similar fastening device for securing the forward end of shock absorber 14 to a bracket 73 extending across the back of the pilot seat 12.

A modified form of the means for securing the lower portion of the stanchion 23 to the slotted track 16 is shown in Fig. 6. Instead of having the yieldable support for gradually absorbing an excessive load imposed vertically upon the structure, the bolt assembly 36a is simply passed through an opening 74 near the bottom of the stanchion 23 and secured to track 16.

The operation of the device in the case of a sudden stoppage of the aircraft such as would be encountered in a crash landing is essentially as follows:

Assuming that the lap and shoulder harness 18 is positioned so that the occupant is held rigidly against the back of the seat and that the aircraft 11 is brought to a sudden stop such as would be experienced in a crash landing, it will be appreciated that very great forces will be imposed upon the shear rivets 31 and 38 of both the upper supporting member 13 and the fixture 33 respectively. Should these forces be sufficiently great to cause both of the aforementioned shear members to fail, the seat 12, within which a pilot or passenger is confined, will immediately move forward along track 16, such movement, however, being resisted by the shock absorber member 14. As the seat moves forward, the rod 56 will tend to be withdrawn from the assembly. This action will cause the shear washers 58 to impose a resisting force on the bushing 66 of sleeve 53 so that movement of the rod will cause failure of one or more of the shear washers 58. Should the force be great enough to cause all of the shear washers positioned along the rod to fail, additional shock loading will be taken up and absorbed by the shearing force imposed upon washers 55 as they come in contact with the bushing 65 or the remaining portion of washers which have previously failed.

In Fig. 3 is illustrated the condition in which all the shear washers have been caused to fail. Due to the fact that the forward load has been absorbed by the shearing action imposed upon the various shear washers, no recoil in the use of this device will be experienced, such as would be the case should a plurality of compression or tension springs be employed. Should a vertical load be imposed upon the seat supports, then such load will be resisted by the shear pin 50. In case this load is sufficient to cause failure of the shear pin 48, then the hardened metal bushing 49, inserted in the bottom of stanchion 23, will be caused to come into contact with the topmost shear washer of shock absorber 15, causing failure of one or more of the washers. As in the case of the shock resisting member 14, no recoil action will be experienced in the use of this device.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. In combination with a seat for use in an aircraft or the like, a supporting structure therefor comprising shear means securing the upper portion of said seat to said aircraft, a second shear means securing the lower portion of said seat to said aircraft, and means secured to said seat adapted to absorb yieldably shock loading imposed thereon due to rapid stoppage of said aircraft, said loading being of sufficient magnitude to cause failure of said shear means.

2. In combination with a seat for use in an aircraft or the like, a supporting structure therefor comprising shear means securing the upper portion of said seat to said aircraft, a second shear means securing the lower portion of said seat to said aircraft, and means secured to the back of said seat adapted to absorb yieldably shock loading imposed thereon due to rapid stoppage of said aircraft, said loading being of sufficient magnitude to cause failure of said shear means and relative displacement of said seat in a substantially forward direction with respect to said aircraft.

3. In combination with a seat for use in an aircraft or the like, a supporting structure comprising shear means securing the upper portion of said seat to said aircraft, a second shear means securing the lower portion of said seat to said aircraft, means secured to the back of said seat and to said aircraft adapted to absorb yieldably shock loading imposed thereon due to rapid stoppage of said aircraft, such loading being of sufficient magnitude to cause failure of said shear means and relative displacement of said seat with respect to said aircraft, and means associated with said second mentioned shear means adapted to insure movement of said seat in a substantially forward direction.

4. In combination with a seat for use in an aircraft or the like, a supporting structure comprising shear means securing the upper portion of said seat to said aircraft, a second shear means securing the lower portion of said seat to said aircraft, and means, secured to said seat, comprising a tubular member and a reciprocably operable component mounted therein provided with a plurality of shear elements adapted to shear within said tubular member thereby yieldably absorbing shock loading imposed thereon due to rapid stoppage of said aircraft, said loading being of sufficient magnitude to cause failure of said first and second mentioned shear means.

5. In combination with a seat for use in an aircraft or the like, a supporting structure comprising shear means securing the upper portion of said seat to said aircraft, means associated with said shear means adapted to resist the application of torsional loads thereto, a second shear means securing the lower portion of said seat to said aircraft, and means secured to said seat adapted to absorb yieldably shock loading imposed thereon due to rapid stoppage of said aircraft, said loading being of sufficient magnitude to cause failure of said shear means.

6. In combination with a seat for use in an aircraft or the like, a supporting structure comprising shear means securing the upper portion of said seat to said aircraft, means associated with said shear means adapted to resist the application of torsional loads thereto, a second shear means securing the lower portion of said seat to said aircraft, and means, secured to said seat, comprising a tubular member and a reciprocably operable component mounted therein provided with a plurality of shear elements adapted to shear within said tubular member thereby yieldably absorbing shock loading imposed thereon due to rapid stoppage of said aircraft, said loading being of sufficient magnitude to cause failure of said first and second mentioned shear means.

7. In combination with a seat for use in an aircraft or the like, a supporting structure comprising shear means securing the upper portion of said seat to said aircraft, means associated with said shear means adapted to prevent the application of torsional loads thereto, a second shear means securing the lower portion of said seat to said aircraft, means secured to said seat comprising a tubular member and a reciprocably operable component mounted therein provided with a plurality of shear elements adapted to shear within said tubular member thereby absorbing shock loading imposed thereon due to rapid stoppage of said aircraft, said loading being of sufficient magnitude to cause failure of said first and second mentioned shear means, and means associated with said second mentioned shear means adapted to insure movement of said seat in a substantially forward direction.

8. In combination with a seat for use in an aircraft or the like, a supporting structure comprising shear means securing the upper portions of said seat to said aircraft, means associated with said shear means adapted to prevent the application of torsional loads thereto, a second shear means securing the lower portion of said seat to said aircraft, a pair of tubular members mounted at the lower portion of said seat having reciprocably operable components mounted therein provided with a plurality of shear elements adapted to shear within said tubular members thereby absorbing shock loading imposed thereon due to rapid stoppage of said aircraft, said loading being of sufficient magnitude to cause failure of said first and second mentioned shear means, and means associated with said second mentioned shear means adapted to insure movement of said seat in a substantially forward direction.

9. For use in a vehicle in combination with a seat and passenger restraining safety means associated therewith, a supporting structure therefor comprising means securing said seat to said vehicle adapted to withstand normal loading imposed thereon and to fail when a predetermined shock loading is encountered thereby, and means secured to said seat adapted to absorb yieldably shock loading to which said vehicle may be subjected causing failure of said first mentioned means.

10. For use in a vehicle in combination with a seat and passenger restraining safety means associated therewith, a supporting structure therefor comprising shear means securing said seat to said vehicle, and means secured to said seat adapted to absorb yieldably shock loading imposed thereon, said loading being of sufficient magnitude to cause failure of said shear means.

11. For use in a vehicle in combination with a seat and passenger restraining safety means associated therewith, a supporting structure comprising means securing said seat at its upper and lower portions to said structure, said means adapted to withstand normal loading imposed thereon and to fail when a predetermined shock loading is encountered thereby, and means secured to said seat adapted to absorb yieldably shock loading to which said vehicle may be subjected causing failure of said first mentioned means.

FREDERICK P. DILLON.